(12) United States Patent
Eslambolchi et al.

(10) Patent No.: US 6,591,055 B1
(45) Date of Patent: Jul. 8, 2003

(54) SHEATH BONDING ARRANGEMENT FOR FIBER OPTIC CABLE SPLICES

(75) Inventors: Hossein Eslambolchi, Los Altos Hills, CA (US); John Sinclair Huffman, Conyers, GA (US); David W. Roberts, Coppell, TX (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/002,044

(22) Filed: Nov. 2, 2001

(51) Int. Cl.[7] ................................................ G02B 6/00
(52) U.S. Cl. ......................................... 385/136; 439/98
(58) Field of Search ................................ 385/136, 137, 385/101; 439/98, 431, 433, 434

(56) References Cited

U.S. PATENT DOCUMENTS

| | | | |
|---|---|---|---|
| 1,910,022 A | * 5/1933 | Legg | ........................ 439/433 |
| 4,958,903 A | 9/1990 | Cobb et al. | |
| 5,371,819 A | 12/1994 | Szegda | |
| 5,636,306 A | * 6/1997 | Mock et al. | ................. 385/101 |
| 5,652,820 A | 7/1997 | Glaser et al. | |
| 6,091,877 A | 7/2000 | Eslambolchi et al. | |
| 6,427,045 B1 | * 7/2002 | Matthes et al. | ............. 385/136 |

* cited by examiner

*Primary Examiner*—Javaid H. Nasri

(57) ABSTRACT

A bond device for fiber optic cables allows for an electrical bond to be made between the cables without the need to first strip away the outer poly covering on each cable. The bond device comprises a metallic lug element which includes a cable-receiving channel, the interior surface of the channel having at least one (and, preferably, a plurality of) outwardly extending barbed tooth. As the metallic lug is clamped around the cable, the tooth/teeth penetrate the outer poly layer and contact the underlying metallic sheath material. The lug may then be coupled to another such lug via a stranded wire bonding ribbon attached between the lugs.

20 Claims, 3 Drawing Sheets

SHEATH BONDING ARRANGEMENT FOR FIBER OPTIC CABLE SPLICES

TECHNICAL FIELD

The present invention relates to fiber optic cable splices and, more particularly, to an arrangement for providing metallic sheath bonding at cable splice locations.

BACKGROUND OF THE INVENTION

Fiber optic cable has become a standard transmission medium for many different communication systems. In general, a fiber optic cable consists of a number of a separate optical fibers stranded together, and (usually) including a central metallic strength member to provide outer mechanical support to the cable, as well as to provide an electric signal path that is used to send certain operational tones along the length of the cable. Plastic coatings (in general, a poly-based material) may then be used to cover the metallic sheath, particularly when the cable is to be buried in the ground.

Electrical bonding of the metallic sheath layer of one fiber optic cable to another at a splice location is essential for protection from lightning or stray voltages induced from power lines, as well as for proper operation of cable-locating tones. The current practice of bonding cable sheaths requires that the cable be stripped of its outer poly coating and a grounding lug be inserted underneath a grip block in the splice closure, with each cable grounded to the splice closure housing. Most splice closure housings are constructed of metallic material so that the electrical continuity of the cables is retained through this connection to the closure housing. However, this method is considered to be poor at best, since temperature changes may cause this arrangement to become released, allowing for lightning strikes and/or stray voltages to burn at locations where there is a poor connection. This will result in damage to the delicate fibers housed inside the metallic/poly cable housing.

Thus, a need remains in the art for a better method of providing for bonding of the metallic sheaths of fiber cables at splice locations.

SUMMARY OF THE INVENTION

The need remaining in the art is addressed by the present invention, which relates to fiber optic cable splices and, more particularly, to an arrangement for providing metallic sheath bonding at fiber optic cable splice locations. In accordance with the present invention, a specially-formed metallic bond lug is disposed to surround the outer poly coating layer of each fiber optic cable. The bond lug is formed to include a plurality of barbed metallic teeth on its underside that will penetrate the exterior poly sheath and contact the underlying metallic sheath layer, allowing the sheath layer to be bonded via the connection to the barbed teeth. The bond lugs on a pair of fiber optic cables can be electrically connected through a wire cable to provide continuity between the sheath layers on the pair of fiber optic cables. Thus, the use of a barbed bond lug in accordance with the present invention eliminates the time and expense associated with stripping away the outer poly covering layer, as was required in prior art arrangements.

In a preferred embodiment of the present invention, the metallic bond lug is formed as a "clam shell" element that can easily be clamped to surround cables of different diameters, and properly torqued down with a screwdriver or adjustable wrench. Inserts may be disposed within the lug to prevent over-tightening, which would cause the barbed teeth to penetrate the sheath layer and extend into the fibers themselves.

A threaded bolt may be included and extend from the bond lug for attachment of a bonding ribbon (the opposite end of the ribbon then being attached to the bond lug of the other cable in the splice), or used to provide a "ground" attachment for the arrangement.

Other and further aspects and arrangements of the present invention will become apparent during the course of the following discussion, and by reference to the accompanying drawings.

BRIEF DESCRIPTION OF THE DRAWINGS

Referring now to the drawings.

DETAILED DESCRIPTION

Figure 1:
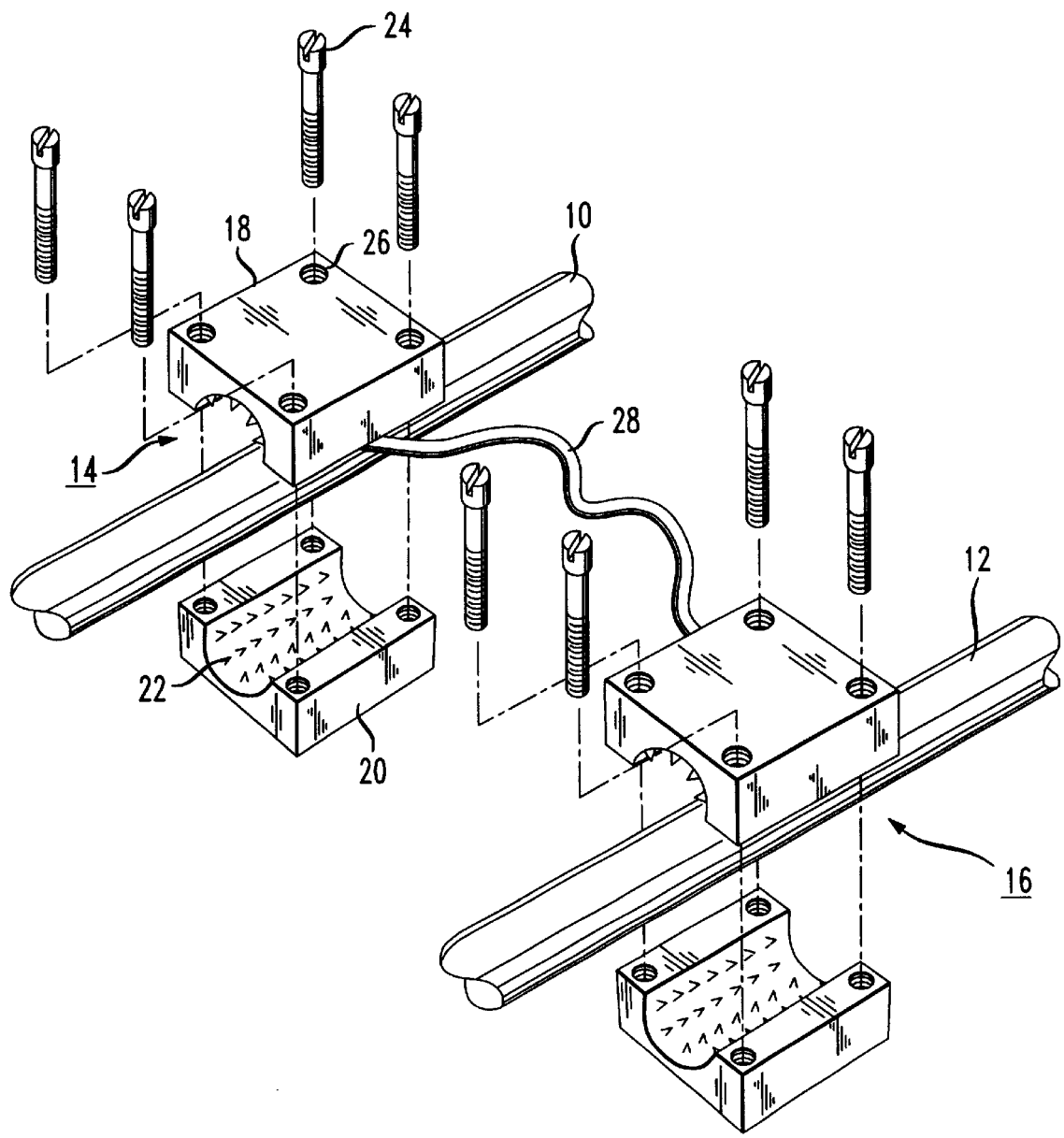
FIG. 1 illustrates, in an exploded isometric view, an exemplary pair of bond lugs of the present invention as each is attached around one cable of a pair of fiber optic cables.

FIG. 1 illustrates, in an exploded fiber, a pair of metallic sheath bond lugs for use in bonding the sheath of one fiber optic cable to another in accordance with the present invention. In this example, it is desired to provide an electrical bond between the sheath of a first fiber optic cable 10 and the sheath of a second fiber optic cable 12. A first metallic bond lug 14 of the present invention is shown (in exploded form) surrounding first fiber optic cable 10 and a second metallic bond lug 16 is shown as surrounding second fiber optic cable 12. Bond lug 14 comprises an upper clamp piece 18 and a lower clamp piece 20, each having a longitudinal channel 21 (as clearly depicted in FIG. 2). The interior surface of each clamp channel 21 has at least one, and preferably a plurality, of metallic barbed teeth 22 extending therefrom, teeth 22 being of predetermined height so as to penetrate through the outer poly coating layer of fiber optical cable 10 and contact the underlying metal grounding sheath, without damaging the individual fibers within the central portion of the cable.

Various arrangements may be used to attach clamp pieces 18 and 20 together to surround fiber optic cable 10. The particular embodiment of FIG. 1 uses a plurality of screws 24 which pass through threaded screw holes 26, as shown, and are tightened a predetermined amount to force barbed teeth 22 to penetrate the outer poly layer of the cable and contact the underlying metallic grounding sheath. The amount of tightening may differ, as a function of the length of the barbed teeth, the diameter of the fiber cable, and the thickness of the outer poly coating layer. For use in the field by installers, instructions included with the lug elements may define, for example, the number of turns used by the different diameter cables. A barbed bond lug 16 of the present invention is similarly clamped to second fiber optic cable 12. As shown in FIG. 1, a stranded copper (insulated) wire 28 is connected between bond lugs 14 and 16 to provide an electrical signal path between the two lugs.

Figure 2:
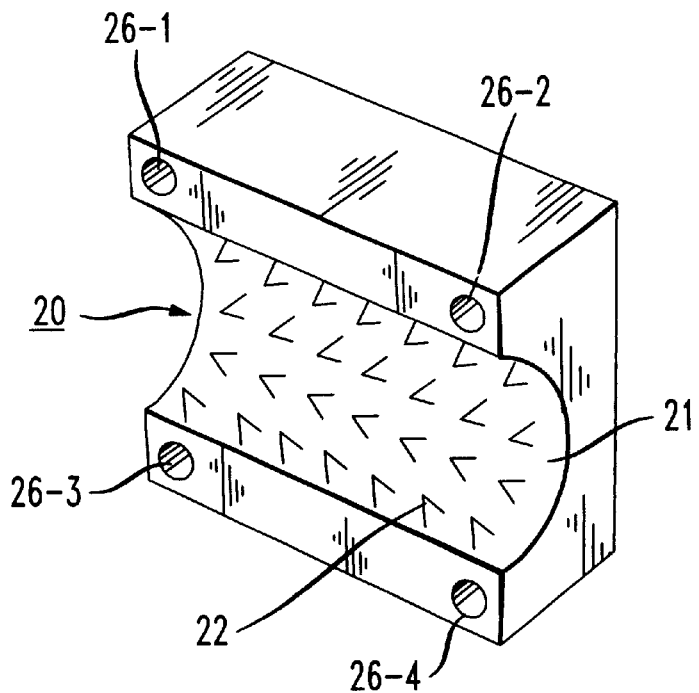
FIG. 2 is a detailed illustration of an exemplary portion of a barbed fiber lug of the present invention.

FIG. 2 contains an enlarged view of clamp piece 20 of FIG. 1, illustrating in particular the rows of teeth 22 disposed to cover channel 21 along the inner surface of piece 20. As shown, channel 21 is half-cylindrical in cross section, so as to accommodate the circular diameter of the fiber cable. In this particular arrangement, a set of four screw holes 26-1, 26-2, 26-3, and 26-4 are formed at the corners of clamp piece 20, and will align with a similarly disposed set of screw holes in clamp piece 18 upon attachment, as discussed below in association with FIG. 3.

Figure 3:
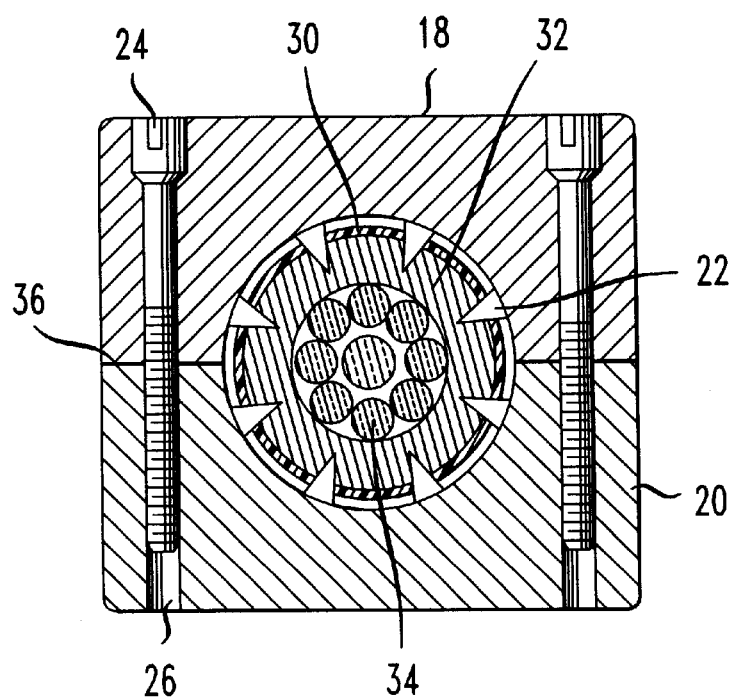
FIG. 3 is a cut-away side of a fiber optic cable surrounded by a bond lug of the present invention.

FIG. 3 illustrates a cut-away side view of an exemplary fiber optic cable (such as fiber cable 10) surrounded by barbed bond lug 14. It is clear from this view that barbed teeth 22 of upper clamp piece 18 and lower clamp piece 20 are formed to penetrate through the outer poly coating layer 30 of fiber optic cable 10 and contact underlying metallic sheath 32 (which in most cases comprises a plurality of metal strands formed to surround the bundle of optical fibers). A plurality of optical fibers 34 are illustrated as disposed in the inner region of cable 10, and remain a sufficient distance from barbed teeth 22 to insure that the teeth do not damage or otherwise contact the fibers themselves. An adhesive insert 36 may be disposed between upper clamp piece 18 and lower clamp piece 20 to assist in providing a seal between the upper and lower clamps, as well as preventing attachment screws 24 from over-tightening the connection and squeezing the cables too hard (thus damaging the included optical fibers).

Figure 4:
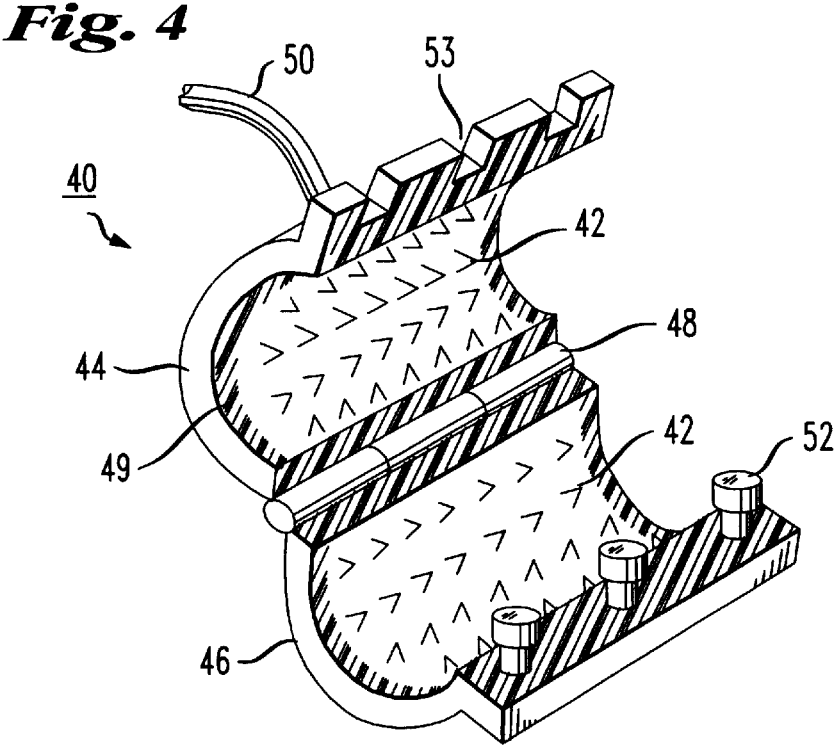
FIG. 4 illustrates an alternative embodiment of the present invention, utilizing a hinged bond lug.
Figure 5:
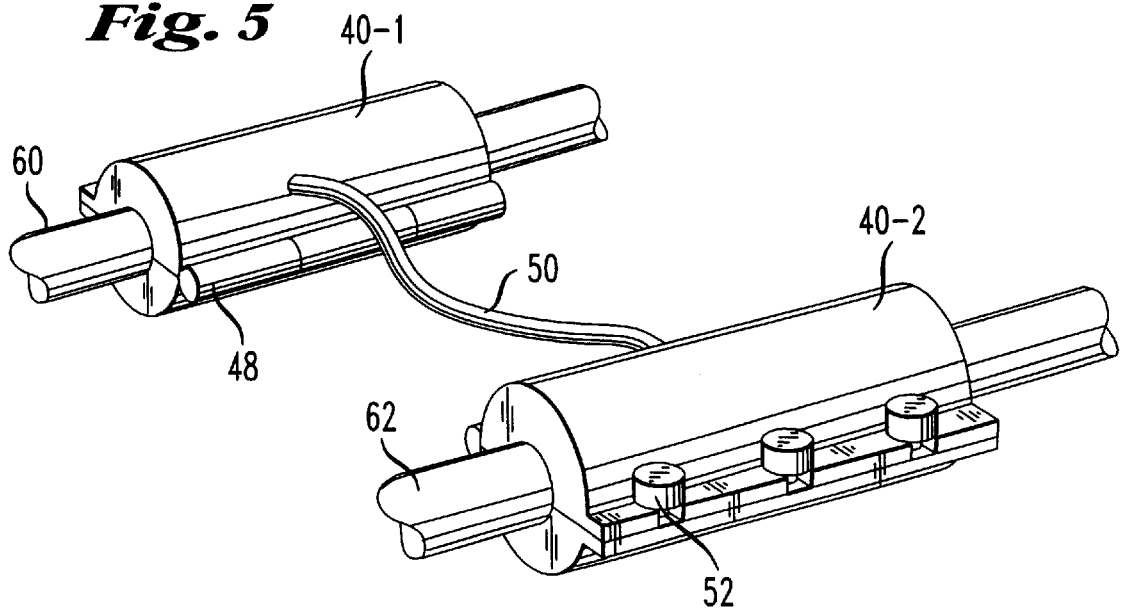
FIG. 5 contains a view of a pair of hinged bond lugs, illustrated in closed form and surrounding a pair of fiber optic cables, with an electrical cable providing connection between the pair of bond lugs.

FIG. 4 illustrates an alternative embodiment of the present invention, which utilizes a one piece, hinged barbed clamp lug 40. As with the arrangement described above, lug 40 is formed to include a plurality of barbed teeth 42 for penetrating the outer poly coating layer of a fiber optic cable and contacting the underlying metallic sheath. In this embodiment, an upper lug member 44 is connected to a lower lug member 46 using a set of hinges 48. A sealing layer 49 may be disposed around the periphery of each lug member, the sealing layers contacting each other when the lug is closed. A grounding cable 50 is illustrated as attached to and extending from upper lug member 44. A plurality of threaded contact locking pins 52 extend into lower lug member 46, which mates with upper lug member 44 upon closure such that each pin sets in a corresponding recess 53. By tightening pins 52, upper member 44 is firmly held against lower member 46, causing teeth 42 to puncture the cable's outer layer. FIG. 5 illustrates a pair of exemplary hinged lugs 40-1 and 40-2 in their closed positions, each surrounding a separate one of a pair of fiber optic cables 60 and 62, respectively. Grounding cable 50 is illustrated as attached between first hinged lug 40-1 and second hinged lug 40-2, providing the electrical connection between their metallic sheath layers.

Many variations on the inventive concepts described above will be readily apparent to those skilled in the art, all of which are embraced in the scope of the claims to follow.

What is claimed is:

1. A bonding arrangement for use with fiber optic cables, said arrangement comprising:

a metallic lug element formed to surround a section of a fiber optic cable, said lug element having an interior longitudinal channel for receiving the fiber optic cable, said channel having an interior circumferential and longitudinal surface area extending substantially the length of said interior longitudinal channel and having a plurality of metallic teeth in substantially all of said surface area, each of said teeth having a predetermined height sufficient to penetrate through an outer protection layer on a fiber optic cable and contact an underlying metallic sheath layer; and a clamping mechanism for securing the metallic lug element around the fiber optic cable such that said plurality of teeth penetrate the outer protection layer and contact the underlying metallic sheath layer.

2. The bonding arrangement as defined in claim 1 wherein the metallic lug element comprises two separate clamp sections, each clamp section having a longitudinal portion of said longitudinal interior channel, each longitudinal portion of said interior channel having a circumferential and longitudinal surface area populated with said plurality of teeth, each of said teeth extending outward from the inner channel of each clamp section.

3. The bonding arrangement as defined in claim 2 wherein the arrangement further comprises an insert, disposed between the clamp sections to prevent the clamping mechanism from over-tightening the fiber optic cable.

4. The bonding arrangement as defined in claim 2 wherein the clamping mechanism comprises a plurality of screws used to fasten the separate clamp sections together, each of said screws contacting the upper and lower clamps and pulling said upper and lower clamps together.

5. The bonding arrangement as defined in claim 2, further comprising an inserting means for sealing and preventing the clamping mechanism from over-tightening the clamp sections together.

6. The bonding arrangement as defined in claim 2, wherein said clamping mechanism comprises a means for varying the spacing between the two clamp sections.

7. The bonding arrangement as defined in claim 2, further comprising an inserting means for preventing the clamping mechanism from over-tightening the clamp sections together.

8. The bonding arrangement as defined in claim 2, further comprising an insert between the clamp sections for sealing the clamp sections together.

9. The bonding arrangement as defined in claim 1 wherein the metallic lug element comprises a hinged clamp, comprising an upper clamp section and a lower clamp section, and an insert, disposed between the upper and lower clamp sections to prevent the clamping mechanism from over-tightening the fiber optic cable.

10. The bonding arrangement as defined in claim 9 wherein the clamping mechanism comprises a locking element for securing together the edges of the upper and lower clamp sections opposite the hinge, said locking element comprising a plurality of locking pins attached to the lower clamp and in mating alignment with a plurality of recesses on the upper clamp, said locking pins extending through said plurality of recesses for tightening said upper and lower clamps together.

11. The bonding arrangement as defined in claim 1 wherein the arrangement is used for forming an electrical ground and further comprises a grounding member disposed on an outer surface of the metallic lug element.

12. An arrangement for providing electrical bonding between a pair of fiber optic cables, the arrangement comprising:

a first metallic lug element disposed to clamp a section of a first fiber optic cable of said pair of fiber optic cables, said first metallic lug element having a first interior longitudinal channel for receiving the first fiber optic cable, the first channel having an interior circumferential and longitudinal surface area extending substantially the length of said interior longitudinal channel and having a plurality of metallic teeth in substantially all of said surface area, each of said teeth having a predetermined height sufficient to penetrate an outer cable layer of the first fiber optic cable and contacting an underlying metallic sheath layer on said first fiber optic cable;

a second metallic lug element disposed to clamp a section of a second fiber optic cable of said pair of fiber optic cables, said second metallic lug element having a second interior longitudinal channel for receiving the second fiber optic cable, the second channel having an interior circumferential and longitudinal surface area extending substantially the length of said interior longitudinal channel and having a plurality of metallic teeth in substantially all of said surface area, each of said teeth having a predetermined height sufficient to penetrate an outer cable layer of the second fiber optic cable and contacting an underlying metallic sheath layer on said second fiber optic cable; and a metallic bonding ribbon connected between the first metallic lug element and the second metallic lug element to provide electrical continuity between said first and second fiber optic cables.

13. The arrangement as defined in claim 12 further comprising a clamping means on each of said first and second lug elements for securing the first and second fiber optic cables such that said plurality of teeth in both said first and second lug elements penetrate the outer protection layer and contact the underlying metallic sheath layer.

14. The bonding arrangement as defined in claim 12, wherein said clamping mechanism comprises a means for varying the spacing between the two clamp sections.

15. The bonding arrangement as defined in claim 12, further comprising an inserting means for preventing the clamping mechanism from over-tightening the clamp sections together.

16. The bonding arrangement as defined in claim 12 wherein each of said first and second metallic lug elements comprises two separate clamp sections, each clamp section having a longitudinal portion of said longitudinal interior channel, each longitudinal portion of said interior channel having a circumferential and longitudinal surface area populated with said plurality of teeth, each of said teeth extending outward from the inner channel of each clamp section.

17. The bonding arrangement as defined in claims 12, further comprising an insert between the clamp sections for sealing the clamp sections together.

18. The bonding arrangement as defined in claim 12, further comprising an inserting means for sealing and preventing the clamping mechanism from over-tightening the clamp sections together.

19. A method of forming a metallic sheath bond between a first fiber optic cable and a second fiber optic cable, the method comprising the steps of:

clamping a first metallic lug element around the first fiber optic cable, said first metallic lug element having a first interior longitudinal channel for receiving the first fiber optic cable, the first channel having an interior circumferential and longitudinal surface area extending substantially the length of said interior longitudinal channel and having a plurality of metallic teeth in substantially all of said surface area, each of said teeth having a predetermined height sufficient to penetrate an outer cable layer of the first fiber optic cable and contacting an underlying metallic sheath layer on said first fiber optic cable;

clamping a second metallic lug element around the second fiber optic cable, said second metallic lug element having a second longitudinal interior channel for receiving the second fiber optic cable, the second channel having an interior circumferential and longitudinal surface area extending substantially the length of said interior longitudinal channel and having a plurality of metallic teeth in substantially all of said surface area, each of said teeth having a predetermined height sufficient to penetrate an outer cable layer of the second fiber optic cable and contacting an underlying metallic sheath layer on said second fiber optic cable; and connecting a metallic bonding ribbon between the first metallic lug element and the second metallic lug element to provide electrical continuity between said first and second fiber optic cables.

20. The method of claim 19, wherein each of said first and second metallic lugs comprise an upper clamp section and a lower clamp section, and further comprising the step of:

tightening the first and section clamp sections of each of said first and second metallic lugs a predetermined amount so as to penetrate the outer cable layer without penetrating a core within the first and second fiber optic cables containing a plurality of optical fibers.

\* \* \* \* \*